United States Patent [19]

Grimes et al.

[11] 4,343,682
[45] Aug. 10, 1982

[54] PLANT HAVING FEED WATER HEATING MEANS FOR NUCLEAR UNITS DURING PLANT START UP AND METHOD OF OPERATING THE SAME

[76] Inventors: Arthur S. Grimes, 148 Wicks Rd., Commack, N.Y. 11725; Robert S. Hunter, 814 Hudson St., Hoboken, N.J. 07030

[21] Appl. No.: 179,803

[22] Filed: Aug. 20, 1980

[51] Int. Cl.³ .............................................. G21C 19/28
[52] U.S. Cl. ...................................... 376/214; 376/402
[58] Field of Search ........................ 176/65, 81, 60, 20

[56] References Cited

U.S. PATENT DOCUMENTS

| | | | |
|---|---|---|---|
| 2,902,831 | 9/1959 | Ipsen et al. | 566/281 |
| 3,047,479 | 7/1962 | Young et al. | 260/376 |
| 3,049,487 | 8/1962 | Harrer et al. | 376/376 |
| 3,103,917 | 9/1963 | Bauer et al. | 172/1 R |
| 3,108,938 | 10/1963 | Nettel et al. | 376/384 |
| 3,167,480 | 1/1965 | West et al. | 376/376 |
| 3,292,372 | 12/1966 | Michel | 376/376 |
| 3,356,583 | 12/1967 | Deighton | 176/65 X |
| 3,467,577 | 9/1969 | Winkler | 376/372 |
| 3,507,747 | 4/1970 | Strohmeyer, Jr. | 176/65 X |
| 3,575,807 | 4/1971 | Ripley | 376/372 |
| 3,630,839 | 12/1971 | Podolsky | 176/65 X |
| 3,973,402 | 8/1976 | Silvestri, Jr. | 176/65 X |
| 3,998,695 | 12/1976 | Cahn et al. | 176/65 X |
| 4,048,012 | 9/1977 | George et al. | 176/65 X |

OTHER PUBLICATIONS

"Principles of Nuclear Reactor Engineering", p. 772.

Primary Examiner—Peter A. Nelson
Attorney, Agent, or Firm—Pennie & Edmonds

[57] ABSTRACT

A plant having feed water heating means for heating feed water supplied to a nuclear steam supply unit during plant start up and/or shutdown. High pressure heaters are positioned in a feed water delivery line between a feed water pump and a steam generator forming part of the nuclear steam supply unit. Steam is admitted into the high pressure feed water heaters from a main steam delivery line extending from the steam generator during start up to heat the feed water.

5 Claims, 1 Drawing Figure

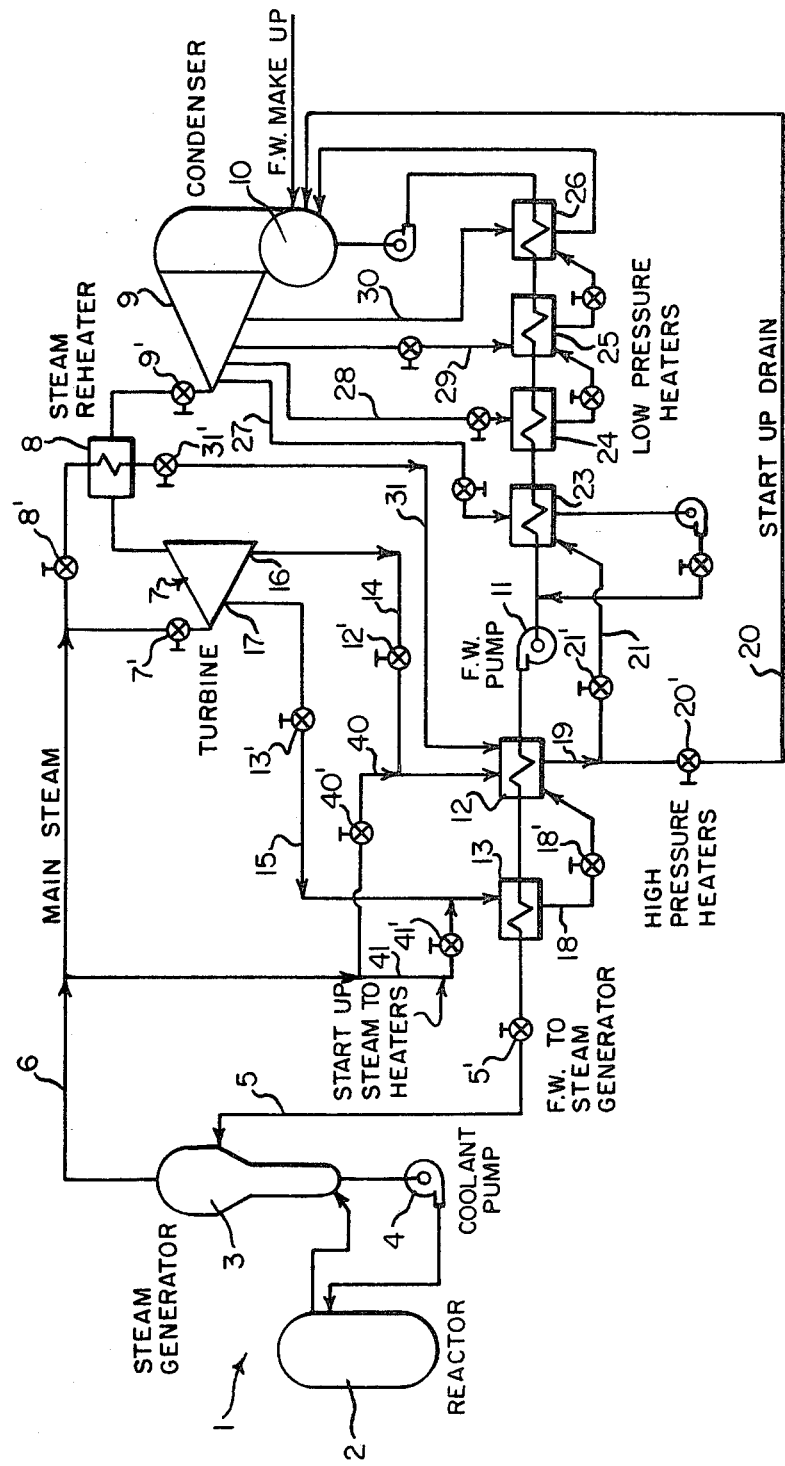

PLANT HAVING FEED WATER HEATING MEANS FOR NUCLEAR UNITS DURING PLANT START UP AND METHOD OF OPERATING THE SAME

FIELD OF THE INVENTION

The invention relates to a plant having a feed water heating means utilized for heating feed water introduced into nuclear units during plant start up and a method of operating the plant.

BACKGROUND OF THE INVENTION

Plants in use utilizing nuclear units for producing a steam supply utilize nuclear reactor coolant pump heat and decay heat from the nuclear fuel within the reactor to bring a nuclear steam supply system up to a maximum temperature before the reactor is made critical to generate nuclear heat. As the water temperature in the nuclear steam supply system increases, steam is generated which is then boiled off to maintain the nuclear steam supply system at desired pressure and temperature conditions. As steam is boiled off, feed water has to be added to the system to compensate for that lost in the boiled off steam. Feed water added to the system is cold and generally at a low temperature while the metal parts making up the nuclear steam supply system are at their maximum operating temperature. The resulting difference in temperature leads to large temperature gradients across the walls of the feed water piping in the system and of the inlet nozzles in the system with the result that the possibility of thermally induced cracks in the feed water piping walls and nozzles is increased.

Further introduction of cold feed water into a hot nuclear steam supply system reduces the temperature of the water already in the system resulting in a decrease in volume of the water in the system. This decrease in volume of the water already in the system may lead to possible overfilling of the system as the newly heated feed water becomes heated and expands.

It is therefore an object of our invention to provide for a plant incorporating an apparatus and a method of operating the same which will result in a reduction of temperature gradients in a nuclear steam supply system during start up of a plant incorporating such a system and at the same time to provide for a plant which will further minimize overfilling of the system with feed water during start up.

GENERAL DESCRIPTION OF THE INVENTION

Broadly our invention comprises a plant having feed water heating means for a nuclear steam supply unit where the feed water may be heated during start up procedures. The plant has a nuclear steam supply unit for changing water to steam, a turbine, and a main steam delivery line connecting the turbine with the nuclear steam supply unit. A condenser is connected to a discharge of the turbine and a feed water delivery line extends from the condenser to the nuclear steam supply unit. A feed water pump is included in the feed water delivery line and at least one high pressure heater is positioned in the feed water delivery line between the pump and the nuclear steam supply unit. A conventional high pressure heater steam delivery line extends from a steam extraction point on the turbine to the high pressure heater and a heater operation valve is included in this line. The heater is provided with a drain.

In addition to the structure included above all of which is conventional, a start up steam line extending from the main steam delivery line to a high pressure heater is provided and includes therein a start up valve. Opening of the start up valve allows steam produced by the nuclear steam supply unit to pass into the high pressure heater in order that it may heat feed water entering into the nuclear steam supply unit prior to and during plant start up. The result is that temperature gradients in the feed water piping and inlet nozzles leading to the nuclear steam supply unit are reduced thus reducing thermal stress of these parts.

The plant may include a plurality of high pressure heaters in the feed water line positioned between the feed water pump and the nuclear steam supply unit. In this event each high pressure heater is connected by a conventional high pressure heater steam delivery line having a heater operation valve therein which leads to an extraction point on the turbine.

BRIEF DESCRIPTION OF THE DRAWING

The drawing illustrates schematically a typical plant having a nuclear steam supply unit including start up feed water heating means constructed according to the invention.

BEST MODE FOR CARRYING OUT THE INVENTION

Referring to the FIGURE, there is illustrated a plant having a nuclear steam supply unit 1 including a nuclear reactor 2, a steam generator 3 and a coolant pump 4. Pump 4 circulates coolant through the reactor where it is heated, then the steam generator, where the heat of the coolant is transferred to feed water to change the feed water into steam. The cooled coolant is then circulated back to the reactor by the pump 4 where it is again heated.

Feed water is fed into the steam generator through a feed water delivery line 5 having a feed water control valve 5' therein. Steam generated in the steam generator 3 is delivered by a main steam delivery line 6 to a high pressure turbine 7 through a turbine control valve 7'. Steam from the high pressure turbine 7 is discharged into a steam reheater 8 and then into a low pressure turbine 9 from which it is then exhausted into condenser 10. As shown, the feed water line 5 extends between the condenser 10 and the steam generator 3 and has therein a feed water pump 11.

A plurality of high pressure heaters 12 and 13 are included in the line 5 between the pump 11 and the steam generator 3 forming part of the steam supply unit 1. High pressure heaters 12 and 13 are connected by high pressure heater steam delivery lines 14 and 15 to extraction points 16 and 17 respectively on the turbine 7. Line 14 has a heater operation valve 12' therein while line 15 has a heater operation valve 13' therein. Heater 13 is connected by a drain 18 having a drain control valve 18' therein to the heater 12. Heater 12 in turn is connected by a drain 19 which in turn connects with line 20 having a drain control valve 20' and which leads to condenser 10. Drain 19 also connects with line 21 which extends to a low pressure feed water heater 23. Line 21 has a control valve 21' therein for regulating flow from drain 19 into the low pressure heater 23.

While only two high pressure heaters 12 and 13 are shown, more could be included wherein the drains of heaters further from the feed water pump would be connected in series to heaters connected closer to the feed water pump.

In addition to low pressure heater 23, further low pressure heaters 24, 25 and 26 are included in the feed water line between the condenser 10 and the feed water pump 11. Low pressure heaters 23–26 are connected by lines 27–30 respectively to extraction points on the low pressure turbine 9.

Steam is admitted into steam reheater 8 from the main steam delivery line 6 through reheater control valve 8' and then passes through line 31 having a vlave 31' therein to the high pressure heater 12.

The structure described above with the exception of the drain 20 and valve 20' is typical of a plant having a pressurized water reactor cycle. In order to provide for heating of the feed water during start up of the plant, we propose to add start up lines 40 and 41 connecting the high pressure heaters 12 and 13 with the main steam delivery line 6. Start up steam control valves 40' and 41' provided with pressure controllers are positioned in the lines 40 and 41 respectively to regulate the pressure and temperature rise in the heaters 12 and 13 during start up of the plant.

The operation of the plant illustrated in the drawing is as follows. Prior to start up, the turbine control valve 7', the steam reheater valve 8' and feed water control valve are all closed and the feed water pump 11 is idle. During start up, it is necessary to add feed water to the steam generator 3 and according to the invention, this feed water is heated prior to entry into the steam generator. This is accomplished by turning the feed water pump 11 on, opening feed water control valve 5' and opening start up control valve 40' to allow steam from the steam generator to pass through lines 6 and 40 to be admitted gradually into the high pressure heater 12. Drain control valve 21' is closed while start up drain control valve 20' is opened such that the only net heat loss is in the heater drain. Any feed water make up that is required is admitted into the condenser 10 through a feed water make up line.

When the temperature rise in the heater 12 approaches its design limit, valve 41' is then gradually opened to admit steam gradually into heater 13 to further increase feed water temperature. Valve 18' is opened to open the drain between heaters 13 and 12. Once the desired temperature rise is reached in each heater, its start up valve can be placed on automatic pressure control.

This mode of feed water heating is continued until turbine 7 is started by opening valves 7' and 9' simultaneously and is partially loaded. The start up valves 40' and 41' are then gradually closed until the pressures in the heaters 12 and 13 are reduced to the pressures in the turbine at the extraction points 16 and 17. Valves 12' and 13' are then opened while at the same time the start up valves 40' and 41' are closed thus transferring steam supply to the heaters from the extraction points. Steam reheater valve 8' and valve 31' are opened allowing flow of steam through the reheater 8. Valve 20' may then be closed and valve 21' opened to connect a drain from the heater 12 into the low pressure heater 23.

The same procedure explained above utilized in start up of the plant may be also utilized in the reverse order when making a controlled shut down of the nuclear steam supply unit 1.

When a reactor plant trips from power, auxiliary feed water is conventionally supplied automatically in place of normal feed water where the pump 11 is shut down. The procedure described above can be used to replace the normally cold auxiliary feed water by restarting the main feed water pump 11 and admitting main steam to the heaters 12 and 13 by opening valves 40' and 41'.

While the nuclear steam supply unit 1 is shown as comprising a pressurized water cycle system having a steam generator 3 positioned exteriorly of the reactor 2, the unit 1 could take the form of a boiling water reactor which does not have a separate steam generator or coolant pump 4 and which would have feed water directly admitted into the reactor.

A plant utilizing the feed water heating means as described above has smaller thermal gradients applied to the line 5 where it enters the steam generator since the temperature of the feed water is raised to more closely approach the temperatures existing in the steam generator. Thermal stresses of the feed water pipes and nozzles where the feed water enters into the steam generator are thus reduced. Further, since heated feed water rather than cooled feed water is admitted into the steam generator, there is less likelihood of inadvertent overfilling of the system because of contraction of water already in the system due to cold feed water being fed into the system.

We claim:

1. A plant having feed water heating means for a nuclear steam supply unit during plant start up where said plant has a nuclear steam supply unit for changing water to steam, a turbine, a main steam delivery line connecting said turbine with said unit, a condenser connected to a discharge of said turbine, a feed water delivery line extending from said condenser to said unit, a feed water pump in said feed water delivery line, at least one high pressure heater in said feed water delivery line between said feed water pump and said unit, a high pressure heater steam delivery line extending between a steam extraction point on said turbine and said high pressure heater, a heater operation valve in said high pressure heater steam delivery line and a drain extending from said high pressure heater; the improvement comprising in having a start up steam line extending from said main steam delivery line to said high pressure heater, and a start up valve in said start up steam line whereby when said start up valve is opened, steam from said main steam delivery line will be admitted to said high pressure heater to heat feed water entering the unit during a plant start up and whereby when said start up valve is closed after plant start up, said operation valve may be opened to admit steam to said high pressure heater from said extraction point.

2. A plant according to claim 1, the improvement further comprising in that a plurality of high pressure heaters are provided in said feed water delivery line with each heater being connected to said main steam delivery line by a start up steam line having a start up valve therein and being connected to a high pressure heater steam delivery line having a heater operation valve therein, and wherein a drain line from a high pressure heater located in the feed water delivery line further from said feed water pump is connected in series with a high pressure heater located in the feed water delivery line closer to said pump.

3. A method of start up of a plant having a nuclear steam supply unit, a turbine, a main steam delivery line connecting said turbine with said unit, a condenser connected to a discharge of said turbine, a feed water delivery line extending from said condenser to said unit, a feed water pump in said feed water delivery line, at least one high pressure heater in said feed water delivery line between said feed water pump and said unit, a high pressure heater steam delivery line extending between an extraction point on said turbine and said high pressure heater, a heater operation valve in said high pressure heater steam delivery line, a drain line extending from said high pressure heater, a start up steam line extending from said main steam delivery line to said high pressure heater, and a start up valve in said start up line, comprising the steps of opening said start up valve during start up of the plant to allow steam to pass from said main steam delivery line to said high pressure heater whereby feed water entering into said nuclear steam supply unit is heated.

4. A method of start up according to claim 3 wherein said plant has a plurality of high pressure heaters each of which is connected to said main steam delivery line by a start up steam line having a start up valve therein and each of which is connected to a high pressure heater steam delivery line having a heater operation valve therein, and wherein a drain line from said heater located further from said pump is connected in series with a heater located closer to said pump, comprising the additional step of opening the start up valve in the start up steam line leading to a first heater located closest to said pump until the feed water passing through said first heater approaches its design limit, then opening the start up valve in the start up steam line leading to a second heater located further from said pump than said first heater to obtain further heating of the feed water.

5. A method of start up according to claim 4 including the additional step of admitting steam to said turbine to start and partially load the same, then partially closing the start up valves in said start up steam lines to reduce the steam pressure in each heater to that equal to the steam pressure at an extraction point on said turbine and then opening the heater operation valves whereby steam is supplied to said heaters from the extraction points, and then completely closing said start up valves.

* * * * *